United States Patent
Goy et al.

(10) Patent No.: US 11,988,209 B2
(45) Date of Patent: May 21, 2024

(54) SPRING RETAINER FOR GEAR PUMP BEARING PLATE

(71) Applicant: Hamilton Sundstrand Corporation, Charlotte, NC (US)

(72) Inventors: Edward W. Goy, Crystal Lake, IL (US); Timothy J. Franckowiak, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 17/541,667

(22) Filed: Dec. 3, 2021

(65) Prior Publication Data

US 2023/0175503 A1    Jun. 8, 2023

(51) Int. Cl.

| F01C 1/18 | (2006.01) |
|---|---|
| F02C 7/22 | (2006.01) |
| F03C 2/00 | (2006.01) |
| F03C 4/00 | (2006.01) |
| F04C 2/00 | (2006.01) |
| F04C 2/16 | (2006.01) |
| F04C 13/00 | (2006.01) |
| F04C 15/00 | (2006.01) |

(52) U.S. Cl.
CPC ............... F04C 2/16 (2013.01); F02C 7/22 (2013.01); F04C 13/00 (2013.01); F04C 15/0026 (2013.01); F04C 15/0057 (2013.01); F04C 2240/50 (2013.01)

(58) Field of Classification Search
CPC ........ F04C 2/16; F04C 13/00; F04C 15/0023; F04C 15/0026; F04C 15/0057; F04C 2240/50; F04C 2240/56; F16F 1/12; F16F 1/121; F16F 1/122
See application file for complete search history.

(56) References Cited

U.S. PATENT DOCUMENTS

| 1,811,987 A | * | 6/1931 | Wales | ................... B21D 45/006 |
|---|---|---|---|---|
| | | | | 267/291 |
| 2,263,707 A | * | 11/1941 | Strigl | ..................... F16H 61/02 |
| | | | | 477/94 |

(Continued)

FOREIGN PATENT DOCUMENTS

| GB | 840000 A | 6/1960 |
|---|---|---|
| GB | 1133737 A | 11/1968 |

OTHER PUBLICATIONS

European Search Report for EP Application No. 22211057.9 dated May 8, 2023.

*Primary Examiner* — Theresa Trieu

(74) *Attorney, Agent, or Firm* — Carlson, Gaskey & Olds, P.C.

(57) ABSTRACT

A gear pump includes a pair of gears having meshed teeth. One of the gears is configured for connection to a source of drive. The gears are received within a housing. The housing has an inlet port configured for connection to a source of fluid and an outlet port. Each of the gears have a shaft rotating within the housing on a bearing on each axial side of each gear. At least one of the bearings associated with each of the pair of gears has a plurality of springs received in recesses to bias the said at least one bearing against an end face of a respective one of the pair of gears. A retention plate holds each of the plurality springs. A method of assembly is also disclosed.

5 Claims, 5 Drawing Sheets

(56) References Cited

U.S. PATENT DOCUMENTS

| | | | | |
|---|---|---|---|---|
| 3,104,616 | A | * | 9/1963 | Peet .................... F04C 15/0026 418/206.7 |
| 3,558,247 | A | * | 1/1971 | Gaertner ............ F04C 15/0026 418/206.7 |
| 4,370,110 | A | | 1/1983 | Nagely |
| 5,417,556 | A | * | 5/1995 | Waddleton .............. F16C 17/26 418/135 |
| 5,772,191 | A | * | 6/1998 | Nakano .................. F16F 1/122 267/179 |
| 5,823,518 | A | * | 10/1998 | Nagamitsu ............. F16F 1/128 267/169 |
| 6,708,946 | B1 | | 3/2004 | Edwards et al. |
| 10,746,148 | B2 | | 8/2020 | Zankl et al. |
| 2005/0013706 | A1 | * | 1/2005 | Jansen ................ F04B 11/0066 417/413.1 |
| 2010/0090379 | A1 | * | 4/2010 | Balsells .................... F16F 1/12 267/166 |
| 2010/0233007 | A1 | * | 9/2010 | Muscarella ............. F04C 2/084 418/206.7 |
| 2013/0087956 | A1 | * | 4/2013 | Krajenke ................ F16F 1/122 267/179 |
| 2018/0100504 | A1 | | 4/2018 | Yates |
| 2018/0163794 | A1 | * | 6/2018 | Deneszczuk ........... F16D 25/12 |

\* cited by examiner

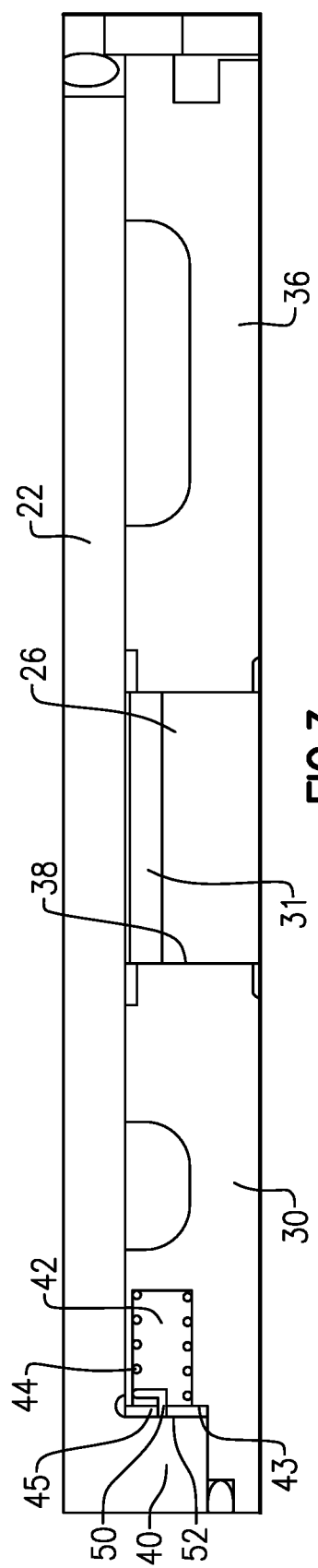
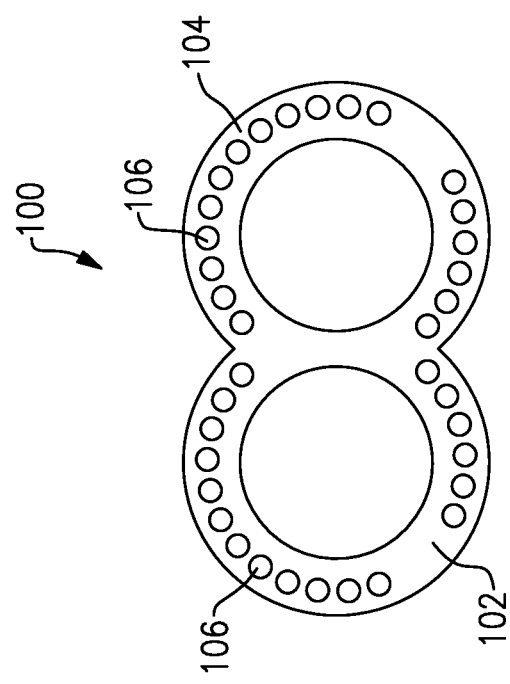
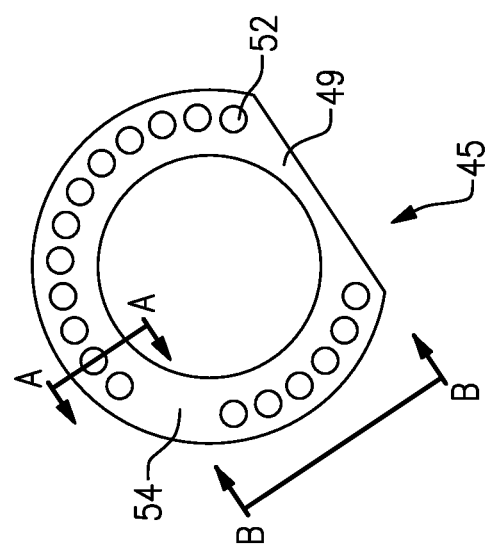

SPRING RETAINER FOR GEAR PUMP BEARING PLATE

BACKGROUND OF THE INVENTION

This application relates to a spring arrangement for a bearing in a gear pump. Moreover, a method of assembling a plurality of springs is disclosed.

Gear pumps are known, and typically have two meshed gears. One of the gears is driven and in turn drives the other. One side of the gears is connected to an inlet for a fluid, and the fluid is driven by openings between gear teeth on each of the gears radially outwardly around the gears to an outlet port which is connected to a use for the fluid.

Bearings are typically placed on each axial side of each gear. One of the bearings tends to be axially fixed, and the other bearing is pressure loaded. At startup there may be challenges with regard to the pressure loaded side. Thus, springs have often been provided to bias the pressure loaded bearing against an end face of each gear.

SUMMARY OF THE INVENTION

A gear pump includes a pair of gears having meshed teeth. One of the gears is configured for connection to a source of drive. The gears are received within a housing. The housing has an inlet port configured for connection to a source of fluid and an outlet port. Each of the gears have a shaft rotating within the housing on a bearing on each axial side of each gear. At least one of the bearings associated with each of the pair of gears has a plurality of springs received in recesses to bias the said at least one bearing against an end face of a respective one of the pair of gears. A retention plate holds each of the plurality of springs.

A method of assembly is also disclosed.

These and other features of the present invention can be best understood from the following specification and drawings, the following of which is a brief description.

BRIEF DESCRIPTION OF THE DRAWINGS

FIG. 3 shows a cross-sectional view of a gear pump.
FIG. 5A shows a retention plate.
FIG. 5B shows an alternative retention plate.

DETAILED DESCRIPTION

Figure 1:
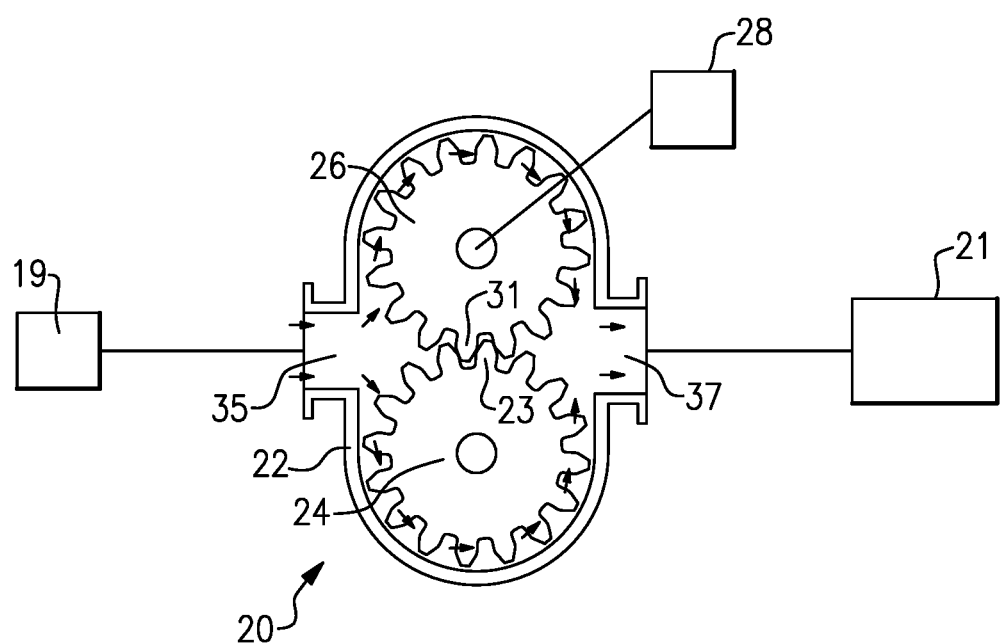
FIG. 1 schematically shows a gear pump.

A gear pump 20 is illustrated in FIG. 1 schematically. As known, a housing 22 defines a pump chamber and surrounds a pair of gears 24 and 26. A motor 28 is shown schematically and may drive the gear 26. Teeth 31 on gear 26 are engaged with teeth 23 on gear 24. The teeth 31 and 23 are engaged, such that when gear 26 rotates (a drive gear) it causes gear 24 (a driven gear) to in turn rotate. As known, the gears 24 and 26 rotate in opposed directions. As the rotation occurs a fluid is moved around the outer periphery of the gears 24 and 26 between an inlet 35 to an outlet 37.

In one embodiment, the gear pump 20 may be utilized to deliver fuel from a fuel tank 19 to a combustor 21, such as may be utilized on a gas turbine engine. Of course, other gear pump applications may benefit from this disclosure. As examples, main and/or scavenge lubricant pumps, hydraulic pumps and pumps for many industrial applications.

Figure 2:
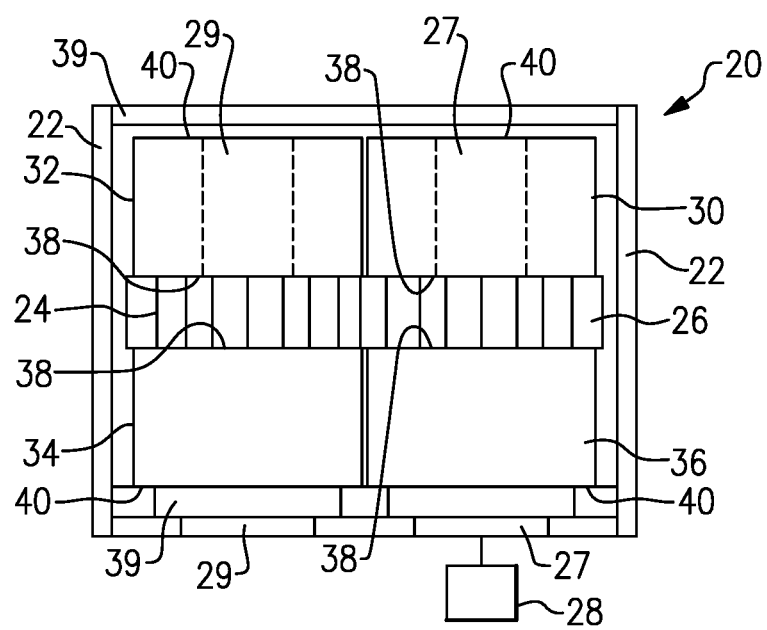
FIG. 2 shows a top view of a gear pump.

As shown in FIG. 2, gear 26 has shaft portions 27 mounted in journal bearings 30 and 36, and gear 24 has shaft portions 29 mounted in journal bearings 32 and 34. Each of the journal bearings have a gear face 38 and a remote face 40.

The housing 22 also includes end plates 39 which, in combination with housing portion 22, enclose the journal bearings 30, 32, 34 and 36, and the gears 24 and 26. As shown, the motor 28 extends outwardly of one of the end plates 39.

FIG. 3 shows a cross-sectional view through half of gear 26, and bearings 30 and 36. Bearing 36 is axially fixed, and bearing 30 is pressure loaded against an end face 38 of the gear 26. At start up, as an example, there are challenges with loading the bearing 30 against the face 38 of gear 26. Thus, springs 44 are mounted within recesses 42 in a remote end face 43 of the bearing 30. Note, an end ledge 40 of the housing 22 provides a reaction surface for the spring 44. A spring retention plate 45 has holes 52 shown here receiving an end pin 50 of the spring 44.

Figure 4:
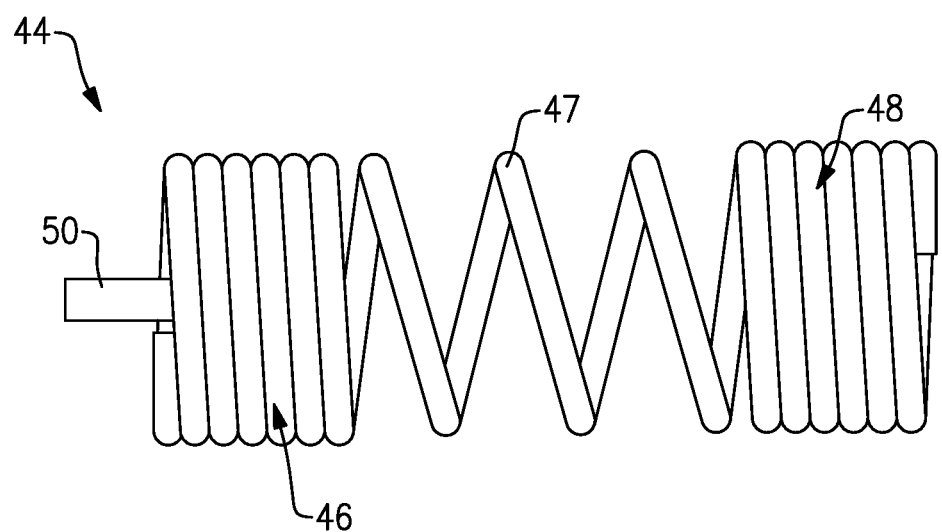
FIG. 4 shows a coil spring.

FIG. 4 shows an example spring 44. The spring has two enlarged ends 46 and 48 with intermediate coils 47 and end pin 50 which serves to retain the spring on the spring plate 45.

FIG. 5A shows a spring plate 45. There are a plurality of holes 52. Each of the holes is intended to receive an end pin 50 from respective coil springs 44. End pins 50 are force fit into holes 52. The springs are circumferentially arranged about the spring retention plate 45. Note, there are no spring holes shown at areas 54 or 49. These are areas that will have less challenge with regard to pressure loading at startup.

The spring plate 45 would utilize separate plates for bearings associated with each of the gears 24 and 26. FIG. 5B shows an embodiment wherein a retention plate 100 has mirrored sides 102 and 104 having holes 106 such that the single retention plate 100 is utilized with a bearing associated with each of the gears 24 and 26.

Figure 6A:
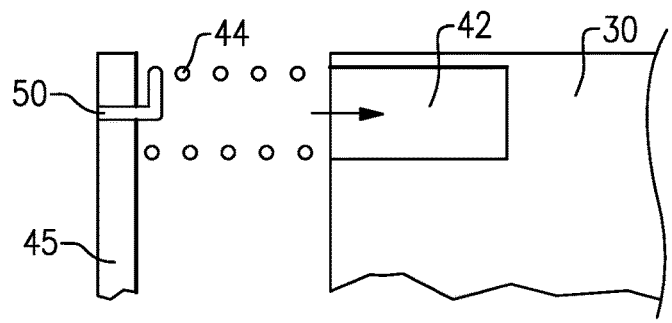
FIG. 6A is a cross-section along line A-A of FIG. 5, but with a spring added.

FIG. 6A shows an assembly view. As shown, a spring 44 is mounted to spring plate 45. End pin 50 is received in a hole 52. The spring retention plate 45 along with spring 44 is moved to the right to be received in the recess 42.

Figure 6B:
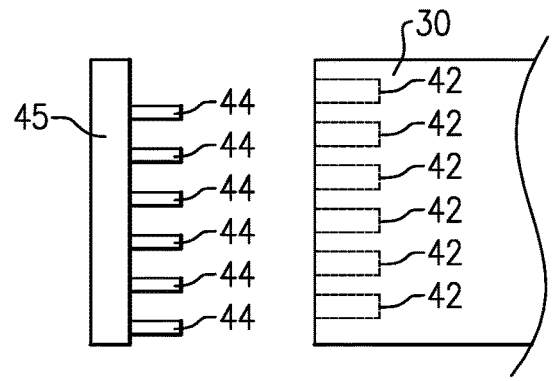
FIG. 6B is a side view along line B-B of FIG. 5, but with plural springs added.

FIG. 6B shows a spring plate 45 holding a plurality of springs 44. Again the spring retention plate 45 and coil springs 44 are moved to the bearing 30 into plurality of recessed bores 42.

Figure 6C:
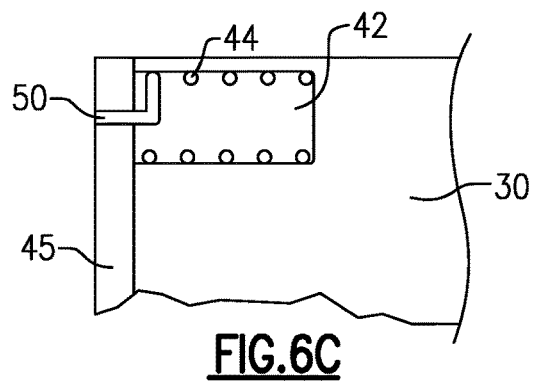
FIG. 6C shows a first embodiment of holding structure.

FIG. 6C shows the spring 44 now received in the recess 42. The end pin 50 could be thought of as a "holding structure."

Figure 6D:
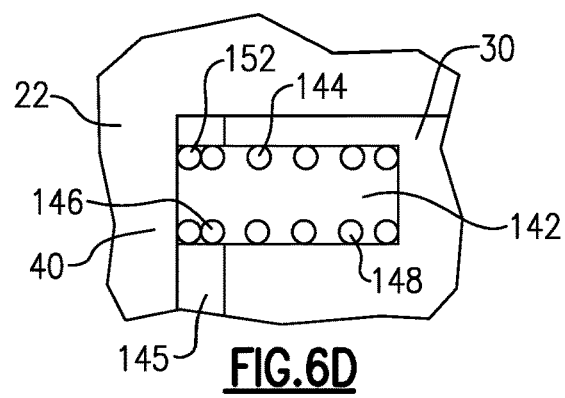
FIG. 6D shows a second embodiment of holding structure.

FIG. 6D shows an alternative wherein a spring 144 has enlarged end coil portions 146 and 148 and enlarged end coil portion 146 is force fit into a hole 152 in a spring retention plate 145. Coil portion 148 is in recess 142. While two specific ways of retaining the spring within the retention plate are disclosed, other types of holding structure may come within the scope of this disclosure.

A gear pump according to this disclosure could be said to have a pair of gears and a bearing mounted at each of two axial ends of each gear. Bias means are biasing at least one of the bearings against an end face of at least one gear, the bias means including an assembly and retention mean, which secures the bias means within the at least one bearing.

The assembly and retention means may be a retention plate having a plurality of holes receiving structure from the bias means to secure the bias means. The bias means may include a plurality of coil springs and the structure is an end pin which is force fit into one of the plurality of holes in the retaining plate.

A method of assembly according to this disclosure comprises the steps of mounting a plurality of coil springs to a spring retention plate, and moving the spring retention plate with the plurality of coil springs into a plurality of recesses in an associated component. The associated component may be a bearing. The bearing may be a bearing in a gear pump, and the plurality of springs are to bias the bearing against an end face of a gear in the gear pump. The spring plate has a plurality of holes each receiving an end pin from one of the plurality of coil springs. The assembled spring plate, plurality of springs, bearing and associated component are moved into a housing as an assembled unit.

Although this disclosure specifically illustrates the assembling of springs within a bearing for a gear pump, the method and apparatus may have application in any number of other system wherein there are a plurality of springs which must be assembled. For that reason, a worker of skill in this art would recognize that certain modification would come within the scope of this disclosure.

Thus, to understand the true scope of this disclosure one should look to the following claims.

What is claimed is:

1. A gear pump comprising:
   a pair of gears having meshed teeth, one of said gears configured for connection to a source of drive;
   said gears received within a housing, the housing having an inlet port configured for connection to a source of fluid and an outlet port;
   each of said gears rotating within a bearing on each axial side of each said gear;
   at least one bearing associated with each of said pair of gears having a plurality of springs received in recesses to bias said at least one bearing against an end face of a respective one of said gears;
   a spring retention plate attached to each of said plurality of springs; and
   wherein each of said plurality of springs has a holding structure received within one of a plurality of holes in said spring retention plate;
   wherein each said holding structure is force fit into a respective one of said plurality of holes in said spring retention plate;
   wherein each of said plurality of springs is a coil spring having enlarged coil portions at each of two axial ends and intermediate coils; and
   wherein said holding structure is one of said enlarged coil portions force fit into one of said plurality of holes in said spring retention plate.

2. The gear pump as set forth in claim 1, wherein said source of fluid is a source of fuel and said outlet port is connected to a combustor in a gas turbine engine.

3. The gear pump as set forth in claim 1, wherein a separate one of said spring retention plate is associated with one said bearing on one of said gears.

4. The gear pump as set forth in claim 1, wherein a single said spring retention plate is associated with said bearing for each of said gears.

5. A gear pump comprising:
   a pair of gears having meshed teeth, one of said gears configured for connection to a source of drive;
   said gears received within a housing, the housing having an inlet port configured for connection to a source of fluid and an outlet port;
   each of said gears rotating within a bearing on each axial side of each said gear;
   at least one bearing associated with each of said pair of gears having a plurality of springs received in recesses to bias said at least one bearing against an end face of a respective one of said gears;
   a spring retention plate attached to each of said plurality of springs;
   wherein each of said plurality of springs has a holding structure received within one of a plurality of holes in said spring retention plate;
   wherein each said holding structure is force fit into a respective one of said plurality of holes in said spring retention plate;
   wherein each of said plurality of springs is a coil spring having enlarged coil portions at each of two axial ends and intermediate coils; and
   wherein said holding structure is an end pin extending away from one of said enlarged coil portions, with said enlarged coil portions being larger than a respective one of said plurality of holes, said end pin being an end of said spring, and an end portion of the coil spring forming one of said enlarged coil portions.

* * * * *